United States Patent Office 3,450,539
Patented June 17, 1969

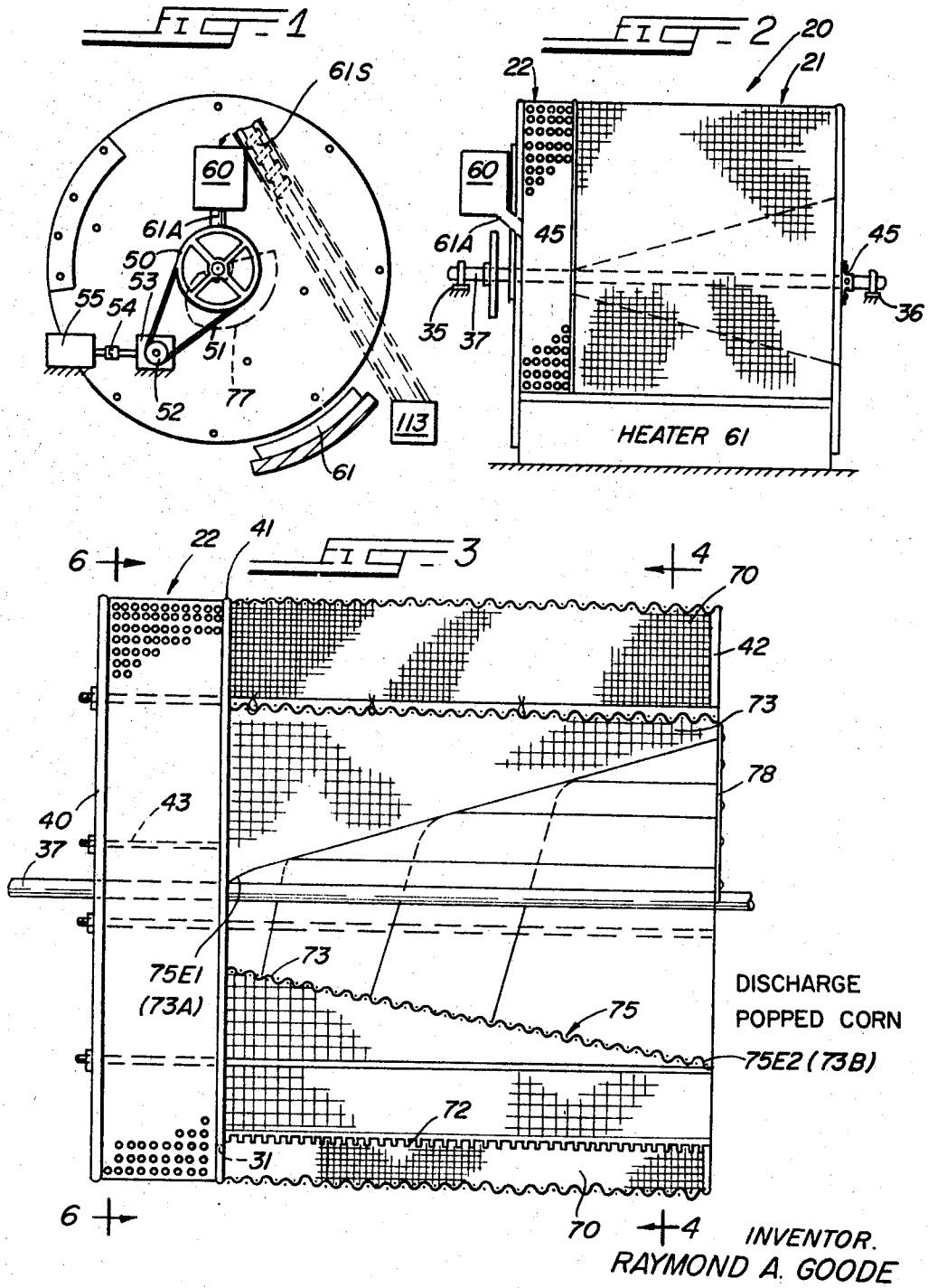

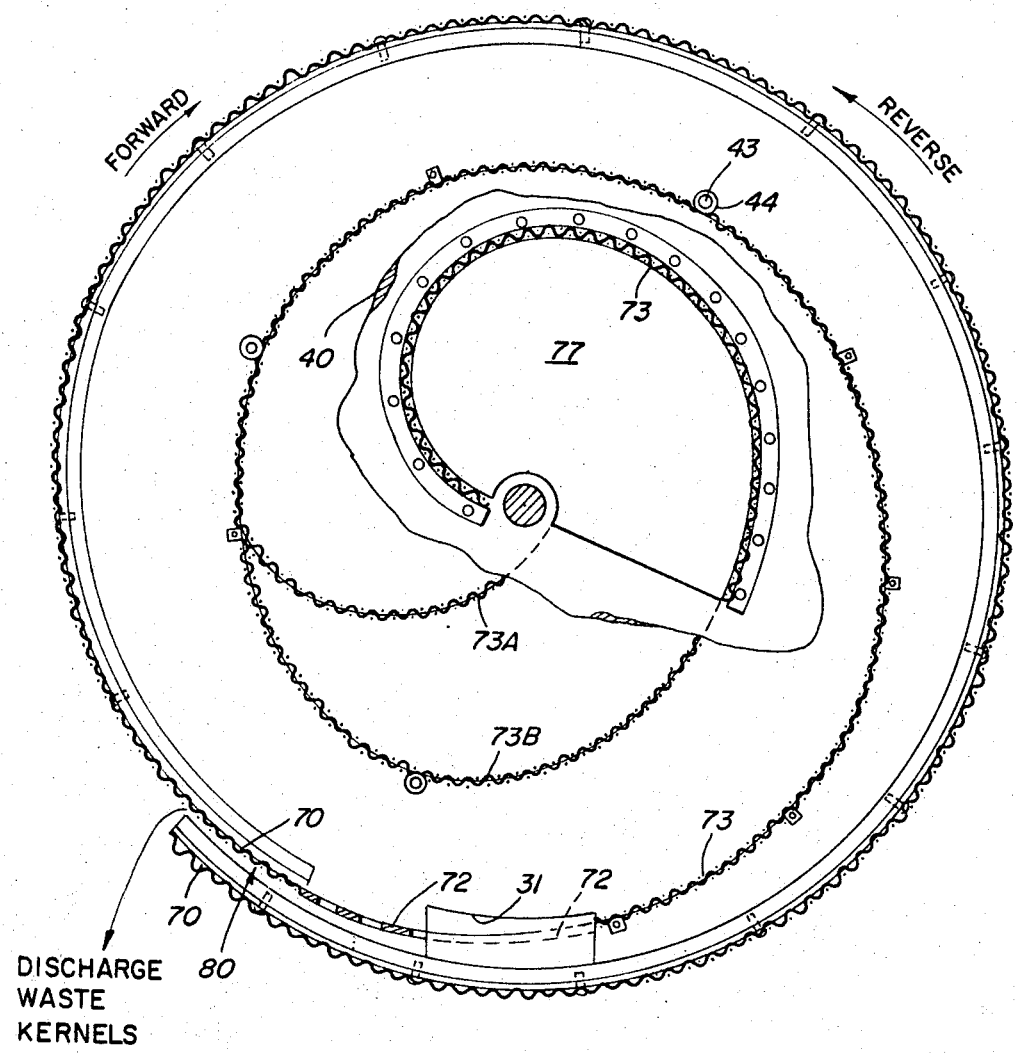

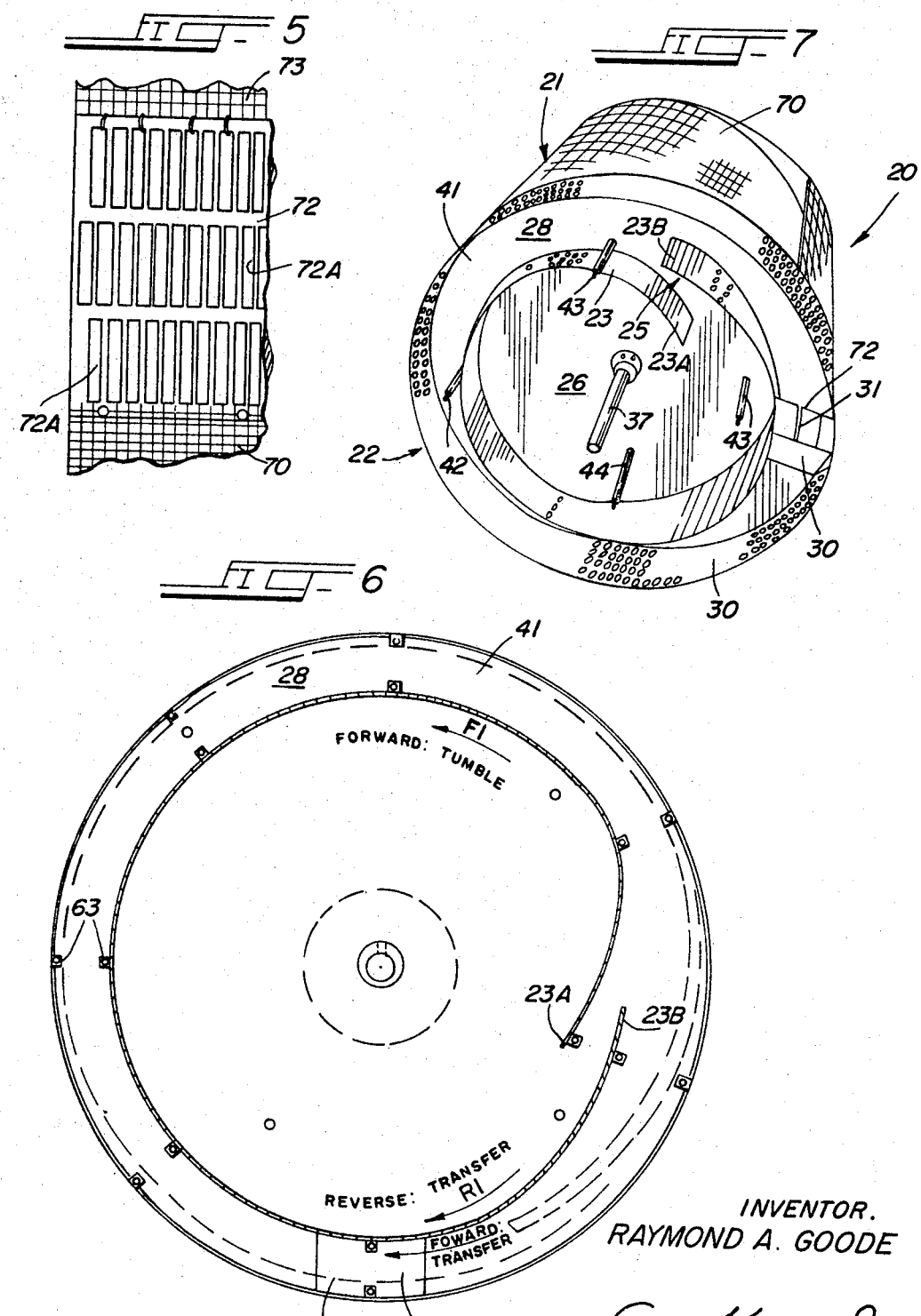

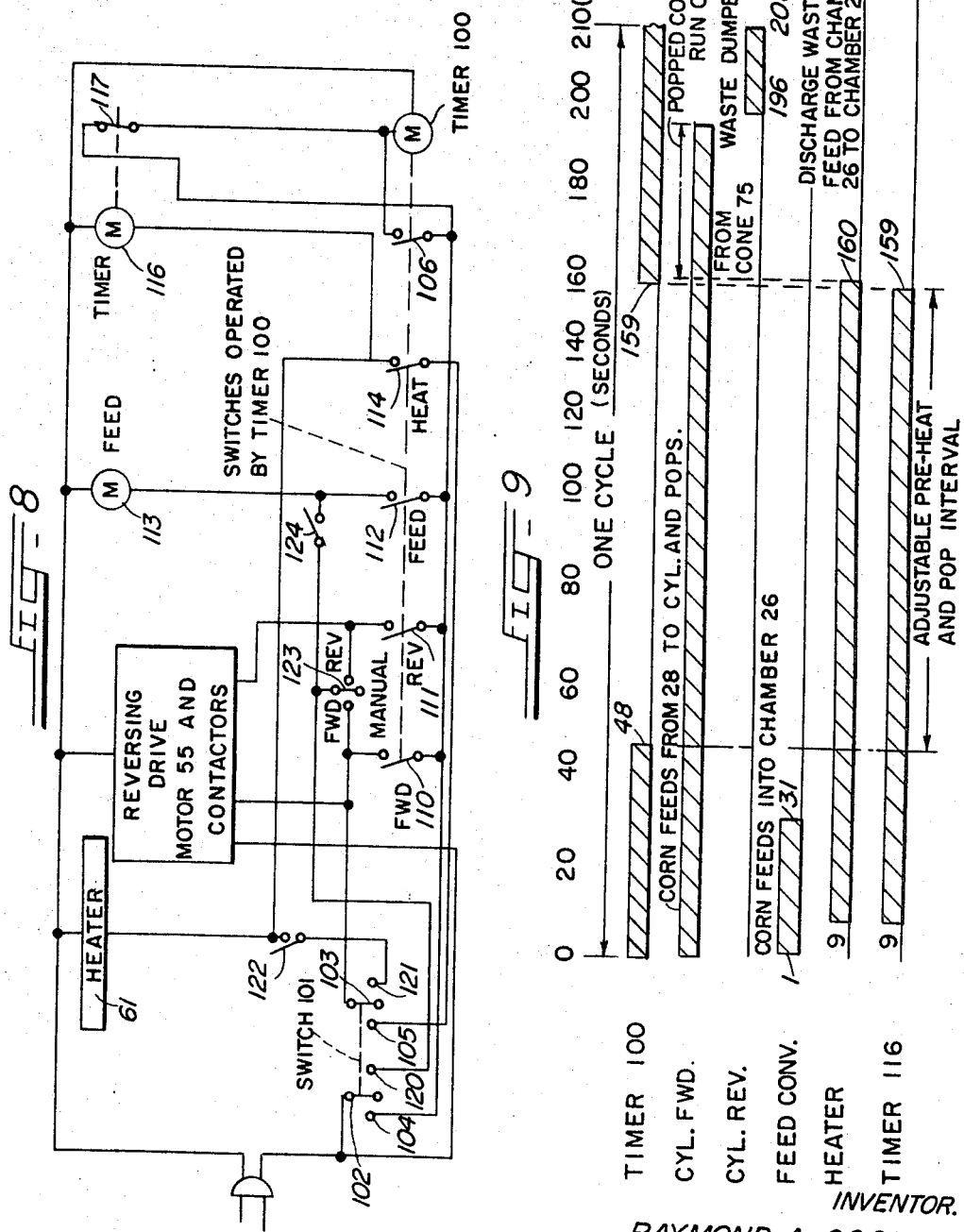

3,450,539
AUTOMATED CORN POPPER FEED
Raymond A. Goode, Elgin, Ill., assignor to Dunbar Manufacturing Co., Inc., South Elgin, Ill., a corporation of Illinois
Filed Feb. 23, 1968, Ser. No. 707,758
Int. Cl. A23l 1/18
U.S. Cl. 99—81                                    10 Claims

ABSTRACT OF THE DISCLOSURE

Cereal grains to be fully expanded, as in the instance of popped corn, are initially fed to a first pre-heat chamber and are tumbled there upon rotation of the chamber for a selected time after which the pre-heated grains are transferred to a second pre-heating chamber and again tumbled prior to transfer to a rotary popping cylinder where final expansion occurs. The apparatus employed preferably combines the pre-heat chambers in a drum in turn united with the popping cylinder, and transfer means are so constructed that transfer of the grains from one location to another occurs as an incident to a reversal in rotation. Further, timing means are so used in conjunction with transfer operations as to enable a first batch of grain to be popped while a second batch is in the course of delivery to the first pre-heat chamber.

---

This invention relates to apparatus for expanding cereal grains and more specifically to the popping of corn automatically in the sense that a predetermined quantity of the corn grains are fed to a pre-heating chamber and maintained there for a predetermined period after which the pre-heated grains are automatically transferred to a popping chamber.

Cereal grains such as popcorn consist mainly of two kinds of starchy material in the endosperm: the starch which is soft and loose, and the corneous starch which is hard and horn-like. A popcorn kernel consists mostly of this hard corneous starch. When this hard material is heated, it becomes plastic, but due to the almost spherical shape of popcorn and its strong hull, the grain of popcorn remains in the same form when heated until the internal pressure (caused by expansion of internal moisture content) exceeds the strength of the containing hull whereupon this hull explodes or "pops" and the plastic material expands. This expansion has a refrigerating action which instantly cools the plastic material and "freezes" it in the well known blossom shape of popped corn.

For popcorn to pop properly, the all important factors are the moisture content as noted above, and the rate of heating of the grain. This rate should be such that each individual grain will be heated to popping temperature in from 1½ to 2½ minutes. If the grain is heated more rapidly than this, it is not uniformly heated throughout and only the outer portion of the grain "pops," resulting in a small popped grain with a gritty incompletely popped or expanded center. Conversely, if the grain is heated too slowly, the heat tends to expunge the moisture to such an extent that there is not enough left to fully expand the grain, resulting in smaller, tougher popcorn. If grains have a damaged hull or are imperfectly shaped, they pop with very little heating and very little expansion resulting in an unacceptable waste product.

There are two commonly used methods of heating the corn rapidly. One method, termed "wet popped" or "french fried," is to expose the grain to a bath of hot popping oil. The oil surrounding the corn transfers the heat to the grain. This process, while thermally efficient and relatively simple, is subject to two drawbacks. One is that the corn is necessarily flavored by the hot oil, and it takes an extremely stable and indigestible oil to withstand the high (400–500 degrees F.) temperatures necessary in this process. Only about half of the expensive oil is delivered with the corn, the rest is lost into vapor or sticks to the pan and to the waste corn. Secondly, in cases where the corn is to be coated (e.g. buttered or caramelled), the oil in the grain interferes with the coating.

The other method is known as dry popping in which each grain is heated in the optimum period of time, while tumbling the grain in a rotary cylinder to insure even heating; and when the kernel pops, it is instantly conveyed away from the source of heat. All imperfectly popped corn is delivered to a waste bin.

Briefly stated, the second method, dry popping, eliminates both the cost and the taste of oil, allowing for full seasoning and much larger kernels compared to a "wet popped" product.

The present invention relates to the second method, that is, apparatus for dry popping in which the corn grains (or other cereal grains to be expanded) are heated in a tumbling chamber where even heat distribution is assured by rolling or tumbling the grains as a mode of constant agitation. When full expansion of a batch is completed, the popping or full expansion chamber is discharged, separating the fully popped kernels from the waste kernels.

In the past, it has been the practice for the attendant to charge the popping cylinder by hand and to control the heating and discharge cycles manually. One of the primary objects of the present invention is to eliminate manual operations through automatic cycling and to expedite the popping process as a whole by initially admitting the grains to be expanded with a pre-heat chamber where the grains are pre-heated prior to being fed to the popping chamber. In this fashion, and as another statement of the primary object, one batch will be in the process of final popping or full expansion while the next batch is in the process of pre-heating.

More specifically, it is an object of the present invention to feed a quantity of cereal grains to a first rotary pre-heat chamber where these grains are partly pre-heated while rotating the pre-heat chamber in one direction. After lapse of the first pre-heat cycle, the first pre-heat chamber is reversed and means then become effective to discharge the conditioned kernels to a transfer or second pre-heat chamber. When this discharge is completed, the first pre-heat chamber is then driven in a forward direction, means become effective to pass the conditioned product from the second pre-heat chamber to the popping cylinder where final expansion of the product takes place, and while these events are occurring, a second batch of kernels may be admitted to the first pre-heat chamber.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention.

In the drawings:

FIG. 1 is an end elevation of apparatus constructed in accordance with the present invention taken substantially on line 1—1 of FIG. 2;

FIG. 2 is a side elevation of apparatus constructed in accordance with the present invention;

FIG. 3 is a cross section on an enlarged scale of the combined pre-heat drum and expander cylinder of the apparatus;

FIG. 4 is a sectional view taken substantially on the line 4—4 of FIG. 3;

FIG. 5 is a fragmentary detail plan view of the separator;

FIG. 6 is a sectional view taken substantially on the line 6—6 of FIG. 3;

FIG. 7 is a perspective view of the pre-heat drum and the expander cylinder;

FIG. 8 is a wiring diagram; and

FIG. 9 is a timing chart.

The apparatus of the present invention is concerned primarily with the popping corn, and this invention will be described in such terms, although it will be appreciated that the apparatus may be used equally well for popping, puffing or expanding other cereal grains wherein the pre-heat, automatic feeding and automatic timing aspects presented by the present invention would be applicable.

Referring to FIG. 7, the present apparatus embodies a rotary member 20 which, as will be explained below, is adapted to be rotated in both a forward and reverse direction. The member 20 combines a grain expanding cylinder 21 and a pre-heat drum 22 attached to one end thereof; and before describing the specific details of construction, it may be observed that the expanding cylinder itself is of known form, being constructed principally of wire mesh of such geometric form as to enable popped corn to undergo expansion to a fully popped state therein, the fully popped product being separated from the incompletely expanded kernels representing a waste product. In fact, the cylinder 21 as used herein, so far as concerns popping per se and delivery of the popped corn, is represented by our Dunbar rotary corn popper, Model Nos. 3600 and 3600-S which themselves have attained an eminent market.

The present invention is concerned primarily with the pre-heat drum 22 and the manner in which it cooperates with the popping cylinder to more efficiently produce a product. The pre-heat drum is also of circular form and comprises a first pre-heat chamber defined by a convolutely wound band 23 having separated ends 23A and 23B so spaced as to present a first transfer means in the form of a passage 25 leading from the first pre-heat chamber 26 to a radially outward second pre-heat chamber 28.

The second pre-heat chamber is outward of and concentrically surrounds the inner pre-heat chamber 26 and is defined by an outer circular band 30. The grains to be pre-heated are fed to the first pre-heat chamber 26 and during forward rotation (arrow F1, FIG. 6) are tumbled therein (grain travel is opposite to cylinder travel) in the course of pre-heat being imparted to these kernels of grains initially fed to the pre-heat drum. Then upon reverse rotation (arrow R1, FIG. 6), these pre-heated grains travel through the first transfer passage 25 into the second preheat chamber 28. The second pre-heat chamber is provided at one end with a divider wall or stop gate 30 which spans both the radial and axial extent of the chamber 28. This divider wall is 360° opposite a second transfer means in the form of an opening 31 in wall 41 which communicates the second pre-heat chamber 28 with the interior of the expanding cylinder 21. However, during the phase of reverse rotation in which pre-heated kernels move from the first pre-heat chamber to the second pre-heat chamber, these grains pile up against the divider wall 30 and continue to be tumbled within the second pre-heat chamber. Then, when the cylindrical member 20 is reversed in its direction of rotation, for repeat forward rotation, the pre-heated grains fer means 31 to the expanding cylinder. Preferably the in the second chamber 28 travel in the opposite direction, arrow F2, FIG. 6, and move through the second transclosure wall or stop gate 30 is projected diagonally across the second pre-heat chamber 28, FIG. 7, to facilitate both tumbling and directional feeding of pre-heated kernels to the popping or expanding cylinder through the opening or passage 31.

With the foregoing introductory description in mind, it will be recognized that when the first batch of pre-heated grains is undergoing transfer from the second pre-heat chamber 28 to the popping cylinder during repeat forward rotation, FIG. 6, a new batch of grains may be admitted to the initial or first pre-heat chamber 26 due to the unusual arrangement of the first and second transfer means or passages 25 and 31. Concurrently with full popping of the first batch of pre-heated kernels thus delivered to the popping cylinder, the second batch of grains will be undergoing the initial pre-heating teatment in the first or radial inward pre-heat chamber 26. In this fashion, the processing of popper corn is greatly facilitated in that a second batch of kernels to be popped will be undergoing conditioning from a preheat standpoint while the first batch is being popped; and as will be explained below, the present apparatus embodies timing means under which the grain popping period or cycle and the preheating period or cycle are automatically timed as a sequence of events.

FIGS. 1 and 2 illustrate the apparatus with the outer casing removed, and this casing presents a pair of end bearing supports schematically identified at 35 and 36, FIG. 2, which rotatably support the main drive shaft 37 by means of which rotation is imparted to the rotary member 20. To this end, the outer or left-hand end of the pre-heat drum 22, FIG. 3, is closed by a solid cover plate 40. A similar cover plate 41 separates the pre-heat drum from the expanding cylinder 21, and the opposite or right-hand end of the expanding cylinder is defined by a cover plate 42. These cover plates are joined for rotation in unison by tie rods 43 and proper spacing between the cover plates is attained by tubular spacers 44, FIG. 7, of appropriate dimension arranged between the cover plates in concentric relation to the tie rods 43. The cover plates 41 and 42 are provided with collars as 45, FIG. 2, secured thereto about the openings therein through which passes the drive shaft 37, and these collars in turn are keyed as by set screws to the drive shaft 37.

A drive sprocket 50, FIG. 1, is keyed to one end of the drive shaft 37 and is rotated by a chain 51 in turn driven by a sprocket 52. Sprocket 52 is rotated through a gear reducer 53, and the initiating gear therein is driven through a flexible coupling 54 in turn powered by a drive motor 55. Positioned above the sprocket 50 is a feed hopper 60 having a discharge spout 61A, FIG. 2, for delivering popped corn through an opening (not shown) in the end plate 40 into the first pre-heat chamber 26. A feeder in the form of a motor operated screw conveyor 61S, FIG. 1, which when rotated, and only then, delivers grain from a supply bin (not shown) to the hopper 60. A heater 62, FIGS. 1 and 2, spans the length of the cylinder assembly 20 and is so positioned that the kernels undergoing pre-heating or popping are tumbled thereabove. The particular form of heat is immaterial and may be by way of electrical resistance, but is preferably gas flame.

As noted above, and again referring to FIG. 7, the preheat chamber 26 is encompassed by a spiral or convolutely wound band 23. Preferably this band is represented by a sheet of perforated sheet metal, and this is equally true of the circular band 30 defining the outer periphery of the second pre-heat chamber 28. In fact, the bands 23 and 30 may be of the same gauge, and it may be noted that the desired geometry of these two bands is maintained by bracket-like tabs 63, FIG. 6, by which the bands 23 and 30 are fastened to the end plate 41. As shown by legend in FIG. 6, forward rotation of the pre-heat drum in a counterclockwise sense will merely tumble the grains or kernels of corn therein, and during the course of such tumbling action the transfer of heat from the heater 61 necessarily produces conditioning of these kernels in the sense that pre-heat is imparted thereto so that the time period required for popping or final expansion is accordingly reduced. The drive motor 55 is the reversing type, and when reversed to produce clockwise rotation of the pre-heat chamber 26, in the direction of the arrow R1, FIG. 6, the pre-heated grains then feed through the transfer passage defined by the spread ends 23A and 23B of the band 23. The grains thus transferred to the second pre-heat chamber 28 undergo tumbling during the course of reverse rotation. The closure gate 30 prevents transfer of the kernels undergoing further pre-heating, and while the closure element 30 is in the form of a solid plate welded in place, it may be of any other suitable form such as a spring-hinged gate (not shown) forced to a closed position across opening 31 by the mere force of the tumbled grains acting thereagainst. In any event, however, reestablishment of forward rotation, the arrow F2 in FIG. 6, in the pre-heated grains in the second pre-heat chamber transferring therefrom through the opening 31 into the popping cylinder.

The outer periphery of the popping cylinder is constructed primarily of a relatively small (No. 8 size) wire mesh 70, FIGS. 3 and 4, started at the outer perimeter of the end plates 41 and 42 and terminating after a 360° turn at one end of a slotted separator plate 72. The separator plate 72, FIGS. 3 and 4, extends for the full axial length of the popping cylinder but spans only a small portion of the peripheral arc. A larger wire mesh 73 (No. 2 size) is joined to the end of the separator plate 72 opposite that to which the wire mesh 70 is joined, and the inner, larger wire mesh is so wound as a continuous spiral as by turns 73A and 73B to present a cone 75, FIG. 3. The cone as 75 is embodied in our commercial Dunbar machine. It will be noted that it has one end 75E1 of small radius immediately adjacent the preheat drum, FIG. 3, and then gradually expands in the opposite direction terminating in a wide end 75E2. Part of the wide end is closed by plate 42, leaving an opening 77, FIGS. 1 and 3, substantially of half-moon shape through which the popped corn emits. A trim ring 78, FIG. 3, borders the opening 77 and serves to clamp in place the wide end of mesh 73.

The slots 72A, FIG. 5, in the separator plate, are relatively large, being of such size as to enable incompletely popped grains to fall therethrough such that the pre-heated grains transferring through the passage 31 will themselves fall through the slots 72A as they enter the rotating popping cylinder, and in doing so move immediately on to the outer wire mesh 70 where popping occurs. The flame is about three inches from the mesh 70. It is to be understood that the degree of heat and the timing of sequences is such that the pre-heated kernels are not popped or fully expanded within the time period involved in initially moving to and through the separator plate 72. To the contrary, full popping will occur only after several cycles of revolution of the popping cylinder following transfer of the pre-heated kernels through the transfer plate to the outer mesh 70. As the kernels pop, however, they are too large to escape through the separator plate or the large mesh 23 and gradually travel down the cone 75 to the discharge opening 77. On the other hand, kernels which will not pop or will not completely pop remain as the outer small mesh screen 70 during each turn from whence they are discharged as a waste product into a collecting bin (not shown) during reverse rotation, FIG. 4, through the slot or opening 80 which exists between the starting and finishing end of the mesh band 70. Unpopped kernels never get to cone 75 because of the separator 72 and the large wire mesh 73.

Under the present invention, the sequence of operation for automatic feed, controlled pre-heating for a predetermined period, automatic transfer between chambers, and the automatic completion of popping during a predetermined popping (heat) period are accurately controlled by timing means. As will be explained in more detail below, a primary or first timer itself controls most functions, including actuation of a secondary timer, and because optimum time for popping may be variant due to the condition of the corn, the quantity to be popped and efficiency of heat source, provision is made herein for adjustment of the popping cycle without necessarily disturbing other functions. Therefore, the secondary timer is adjustable in nature specifically for controlling within rather precise limits the period of the popping cycle.

Referring to FIG. 8, the primary timer is in the form of a timing motor 100, and for fully automatic operation, circuit thereto is completed upon setting switch 101 so that the two contactors 102 and 103 engage contacts 104 and 105. It will be noted that the circuit for energizing the primary timer 100 includes a normally closed switch 106, operated by one of the cams (not shown) driven by timer 100. Switch 106 opens in the course of a cycle of the timer 100 as will be explained.

The primary timing motor starts to run and automatically sequences, by the timing cams driven thereby, switch 110 which allows motor 55 to drive the pre-heat drum and popping cylinder in a forward direction; switch 111 which (ultimately) reverses the same drive; switch 112 as a control means which energizes the motor 113 for the feed conveyor 60, delivering a predetermined amount of popcorn to the first pre-heat chamber while energized; and switch 114 which both energizes the heater 61 and starts the secondary timer 116.

By throwing switch 101 in the opposite direction, so that its contactors 102 and 103 engage contacts 120 and 121, manual control may be exerted as desired. Thus, in this instance, the heater may be energized by manually closing switch 122; the motor 55 may be driven in a forward or reverse direction by appropriately setting the switch 123 by hand; and the motor 113 for the feed conveyor may be operated at will through switch 124.

A typical cycle in terms of seconds is set forth in FIG. 9. With switch 101 set to the position of automatic machine operation, the primary timing means 100 is set in operation concurrently (switch 106 is closed at "zero" time), switch 110 is closed establishing forward rotation of motor 55, and about one second later switch 112 is closed energizing the conveyor motor 113 to feed corn to be popped to the pre-heat chamber 26.

The heater switch 114 is next closed (lapse of about nine seconds to allow for full feed and/or transfer of grain) and concurrently the secondary timer 116 is energized through closure of the same switch. Switch 117, cam controlled through timer 116, opens. After about thirty-one seconds, the feeder switch 112 is opened automatically as an incident to the geometry of its timing cam driven by the timer 100, and thus a predetermined amount of grain has been delivered to the first pre-heat chamber 26. (It will be appreciated that a timing cam, effective to open and close a switch and driven by a timing motor is per se known and by itself is not part of this invention.)

After about forty-eight seconds, switch 106 opens and operation of the primary timer 100 is suspended (switch 117 is open), but the secondary timer 116 continues to operate. In this connection, the secondary timer is adjustable to vary the interval during which it "times out," thereby allowing, FIG. 9, the heating period to be varied, especially during the popping cycle for the reasons explained. When the secondary timer "times out," it re-sets itself and the contacts of switch 117 assume their normally closed state, re-energizing the primary timer 100.

Thus, the timing out period for the secondary timer may be anywhere through the time span indicated in FIG. 9, as an example, and may be longer if necessary. In any event, during the time span, the heater circuit is held operative through closed switch 114, since the primary timer remains inert until switch 117 closes. When switch 117 closes after "timing out" of the secondary timer, the primary timer operates again and completes its "cycle out": switch 114 opens about one second later, disabling the heating means; switch 110 opens about one-half minute later, when the popping cycle is complete, terminating forward rotation; switch 111 is then closed, instituting reverse drive manifest in feeding of kernels from chamber 26 to chamber 28 and concurrent discharge of the waste product from the popping cylinder, completing one cycle of operation after a lapse (example) of two hundred and eight seconds. Then, switch 106 recloses and a new cycle is automatically commenced.

It will be seen from the foregoing, that in accordance with the present invention an accelerated process has been attained for expanding cereal grains, as in the instance of popcorn, and at the same time a fully closed system for processing the grains is realized. Thus the raw or incompletely expanded grain is initially charged to the first pre-heat chamber 26, and this will be in an amount determined by the speed and longevity of operation of the feed motor 113. During initial feeding the pre-heat chamber 26 is constantly rotated by means of the motor 55 driving in a forward direction, and concurrently the heater 61 is in operation. Then upon reversing the drum, the pre-heated kernels are automatically transferred to the second pre-heat chamber 28, without intervening cooling in the sense of the grains being divorced entirely from the heat source, where further agitation and pre-heating is attained. Reverse rotation is a relatively short period of time as will be appreciated from FIG. 9, and upon reinstitution of forward rotation, pre-heated grains in the second pre-heat chamber are transferred without intervening cooling to the expander chamber 21 represented by the popping cylinder described above. Concurrently with this, a new batch of grains automatically feed to the first pre-heat chamber, so that as the first batch is undergoing popping, the second batch is undergoing initial pre-heating. It will be appreciated that, assuming an entire beginning, with no pre-heated grain in the popping cyclinder, some of the controls will be operated manually to prime the machine, and then when the first batch of pre-heated kernels is in the popping cylinder, automatic control is established by an appropriate setting of switch 101 so that the second and third batch, and so on, are automatically sequenced through the last batch.

Hence, while I have illustrated and described a preferred embodiment of my invention, it is understood that this is capable of variation and change within the purview of the appended claims.

I claim:
1. A feed and pre-heat apparatus for a cyclically operable corn popper or like grain expander for cereal grain of the kind in which each cycle of operation of the expander includes a grain expanding period followed by discharge of the fully expanded grain product, said apparatus comprising: a first pre-heat chamber connected to a second pre-heat chamber; feed means for delivering grain to said first pre-heat chamber; control means for actuating said feed means to feed a predetermined quantity of grain into said first pre-heat chamber during said grain expanding period; first transfer means for automatically transferring the grain from said first pre-heat chamber to said second pre-heat chamber during said discharge; and second transfer means for automatically transferring the pre-heated grain from said second pre-heat chamber into said grain expander upon initiation of the grain expanding period in the next cycle of operation of said expander.

2. A feed and pre-heat apparatus according to claim 1 constituting an attachment to a rotary hollow cylinder-type expander which is rotated in a forward direction during said initial expanding period and in a reverse direction during said discharge period, in which said chambers are presented by a compartmented pre-heat drum mounted on and rotatable with said expander, and in which transfer of grain between said pre-heat chambers and into said expander are effected in response to reversals in direction of rotation of said drum.

3. A feed and pre-heat apparatus according to claim 2 in which said first pre-heat chamber is located in the central axial portion of said drum and said second pre-heat chamber is located in the peripheral portion of said drum.

4. A feed and pre-heat apparatus according to claim 3 in which said second pre-heat chamber is of approximately annular configuration and in which said second transfer means comprises a generally radial closure member extending transversely of said second pre-heat chamber and a discharge passage from the second pre-heat chamber to the expander cylinder, said discharge passage being located at the end of said second pre-heat chamber opposite said closure member.

5. A feed and pre-heat apparatus according to claim 2 in which said control means includes an adjustable timing device for adjusting the length of grain expanding and pre-heat periods.

6. Apparatus according to claim 5 in which the pre-heat drum is defined by an outer circular band surrounding an inner convolute band in spaced concentric relation thereto, the convolute band having adjacent separated ends presenting a passageway therebetween and constituting the first transfer means, said second transfer means being a passageway from the second chamber to the expander defined by a divider plate axially spanning the second pre-heat chamber adjacent an opening communicating the second pre-heat chamber with the hollow expander.

7. A feed and pre-heat apparatus according to claim 1 in which said first chamber is a convolute band-like member having a passage therein constituting the first transfer means and which is in communication with said second chamber, said second chamber being defined by a circular band surrounding the first chamber in spaced substantially concentric relation thereto, means joining the bands for rotation together, and said passage being oriented to transfer grains from the first to the second chamber only on rotation of said chambers in one direction.

8. A corn popper comprising: a popping cylinder and a pre-heat drum joined end-to-end as a unit for rotation in forward and reverse directions, means to heat both the drum and cylinder so that grains of corn initially fed to the drum are conditioned by pre-heating for final expansion in the popping cylinder, said drum being confined being confined between a pair of disc-like end plates and having a first pre-heat chamber defined by a radial inward convolute band between said end plates, means to feed grain to be popped initially to the first pre-heat chamber, said band having separated ends defining a transfer passage, said drum having a second pre-heat chamber defined by a second band surrounding the first band in spaced generally concentric relation thereto and being in communication with the first pre-heat chamber via said transfer passage whereby upon rotation of the drum in a forward direction the grain fed to the first pre-heat chamber is merely tumbled therein during the course of pre-heating whereas rotation in a reverse direction is accompanied by transfer of the pre-heated grain through the first transfer passage into the second pre-heat chamber, the popping cylinder and the second pre-heat chamber communicating through an opening defining a second transfer passage allowing grain in the second pre-heat chamber to be transferred to the popping cylinder, one side only of said opening being blocked by a divider in such position that pre-heated grain transferred to the second pre-heat chamber is denied access to said opening during reverse rotation of the drum and is merely tumbled in the second chamber during reverse rotation, rotation of said drum in a forward direction being accompanied by transfer of grain from the second pre-heat chamber through said second transfer passage into said popping cylinder where the pre-heated grains are heated to a fully expanded state.

9. A corn popper according to claim 8 in which means are provided to institute feed of a new batch of grain to the first pre-heat chamber automatically with transfer of grain from the second pre-heat chamber to the popping cylinder.

10. A method of expanding cereal grain by heat, as in the instance of popping corn, comprising: feeding the unexpanded grain to a first pre-heat chamber and subjecting it there to agitation and heat for a predetermined period of time short of full expansion; transferring heated grain from the first pre-heat chamber to a second pre-heat chamber without cooling and subjecting it there to further agitation and pre-heat for a second period of time short of full expansion; transferring the pre-heated grain to an expander chamber and agitating it there in the presence of heat until fully expanded; and, while the grain is being fully expanded in the expander chamber, introducing a new batch of unexpanded grain to the first pre-heat chamber.

References Cited
UNITED STATES PATENTS

| | | |
|---|---|---|
| 1,026,052 | 5/1912 | Rotherham. |
| 1,050,180 | 1/1913 | Taylor. |
| 2,606,489 | 8/1952 | Morsette. |
| 2,812,704 | 11/1957 | Hawks. |
| 3,253,532 | 5/1966 | Jones. |

ROBERT W. JENKINS, *Primary Examiner.*

U.S. Cl. X.R.

99—238.3